United States Patent Office 3,303,599
Patented Feb. 14, 1967

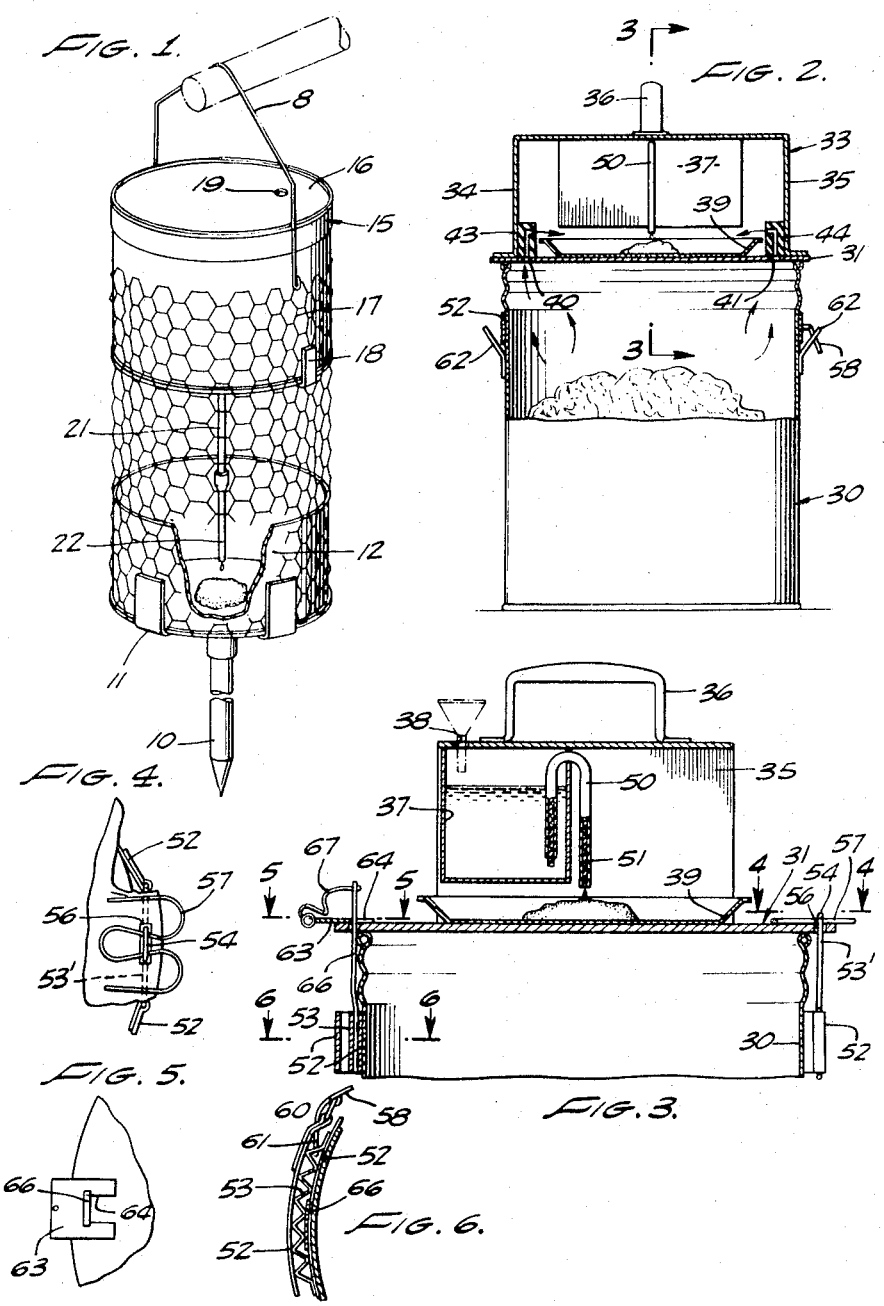

3,303,599
INSECT TRAP
Earcy L. Ballard, 16640 Randall Ave.,
Fontana, Calif. 92335
Original application Feb. 13, 1963, Ser. No. 258,263, now Patent No. 3,224,145, dated Dec. 21, 1965. Divided and this application Dec. 20, 1965, Ser. No. 514,998
7 Claims. (Cl. 43—118)

This invention is a division of my earlier application, Serial No. 258,263, filed February 13, 1963, and now Patent No. 3,224,145, granted December 21, 1965.

This invention relates to novel and improved forms of insect traps for killing numerous types of flies and insects, including mosquitoes, moths, june bugs, spiders and other types of insects that inhabit trees, including brown and green hoppers, etc.

The primary object of the invention is to provide an extremely effective, but simple and economic trap of this type, and further to provide such a device which is entirely safe. It is safe in that the poison that is used is not exposed to children or animals such as to endanger them, and it cannot contaminate or pollute ground water. It is known that extensive use of insecticides in the past has had the effect of polluting ground water as well as destroying bird life and otherwise being unsafe.

Several forms of the invention are disclosed herein. Various types of lures or poisons may be used in the trap. It has been found that dead flies themselves constitute a powerful lure to attract other flies and to bring about their destruction.

In a simplified preferred exemplary, basic form of the invention, it takes the form of an insect trap which can be suspended by a bail or mounted on a stake, or otherwise. In another form of the invention it is built onto a cover which serves as the cover of a garbage can, the fumes from the garbage itself serving as a lure for the insects.

In accordance with the foregoing, another object of the invention is to provide a fly trap comprising containers for a lure or poison and for water, and means for causing a regulated transfer of water from the container containing the water to the other container to keep the lure or poison moist, the containers being arranged to allow insects to have access to the lure or poison.

Another object is to provide a trap of the general type of the foregoing object which is built onto the cover of a garbage can, and which includes means for transferring fumes from the interior of the garbage can, and directing them over the lure or poison to assist in attracting flies or insects.

Another object is to provide a trap as in the foregoing object having improved means for removably securing the cover onto which the trap is built, to a garbage can.

Another object is to provide a trap as in the two preceding objects wherein the means for transferring fumes from the garbage can comprise pieces of relatively soft material having passageways formed therein, providing communication with the interior of the garbage can and positioned to direct fumes over the container for the lure.

Further objects and numerous additional advantages of the invention will become apparent from the following detailed description and annexed drawings wherein:

FIGURE 1 is a perspective view of a preferred exemplary, basic, form of the invention;

FIGURE 2 is a view partly in section of a second form of the invention;

FIGURE 3 is a sectional view taken along the line 3—3 of FIGURE 2;

FIGURE 4 is a detail view taken along the line 4—4 of FIGURE 3;

FIGURE 5 is a detail view taken along the line 5—5 of FIGURE 3;

FIGURE 6 is a detail view taken along the line 6—6 of FIGURE 3;

Referring now to FIGURE 1 of the drawing, this figure shows a simplified form of the invention which is very effective, but is simplified and is extremely economical to fabricate and produce. This type of trap is particularly adaptable to be mounted on a stake, or to be hung from a support such as a tree, rail, rafter or the like. In this figure, numeral 10 designates an upright post at the bottom to which is attached a support bracket or member 11, which supports a container 12 which is open at the top.

Supported a short distance above this container is a second similar, preferably cylindrical container 15 having a cover 16. Surrounding the lower container and extending upwardly between the containers, and around the lower part of the upper container is a wire mesh screen 17 providing an area of mesh between the two containers. The upper container is supported in its position by a transverse member 18 which is extended through the meshes of the screen to form a support underneath the bottom of the upper container. The support bracket 11 may have angular prongs attached to the post and extending outwardly and upwardly along the sides of the lower container, as shown. The trap may be supported by a bail 8 as shown suspended from any convenient means.

The cover of the upper container has a hole 19 for filling it with water. There is a smaller hole in the bottom of the upper container. Fitting in this hole is a rounded stem or stick 21 of wood having a small plastic tube 22 on the end of it. In the operation of this fly trap, the lure or poison is initially placed in the bottom container. The lure may be any of various types of lures or poisons commercially available, such as Fly Killer XXX made by Esco Chemical Company. The lure is kept moist with the water which drops down from the upper container through the stem 21 which preferably is made of balsa wood. The flies are attracted into the lower container and are destroyed therein. The dead flies or other insects themselves, it has been found, constitute a powerful lure for the other flies and insects which are attracted to them. This form of trap has been built and tested and has been found to be very effective for its purpose. It may be used in any area where it is desired to destroy insects, either in areas inhabited by humans or in areas where plants are growing. It is extremely durable, effective, easy to maintain, and completely safe.

Referring to FIGURES 2, 3, 4 and 5, these figures show another form of the trap which is built onto a cover adapted to be locked or latched onto a garbage can. The fumes from the garbage are utilized to assist in attracting the insects to the trap. The garbage can is shown at 30 and the cover onto which the trap is built is shown at 31. Numeral 33 designates a housing or frame which may be made of any suitable material such as cardboard, or plastic or metal having downwardly extending side portions 34 and 35 suitably attached to the cover. Carrying handle 36 is attached to the said frame. Within the frame is a tank 37 for water made of suitable material and it may be filled through an opening 38 in the top.

Mounted on top of the cover 31 is a metal pan 39 for the lure or poison and the insects which are destroyed. The edges of this pan extend to positions adjacent the downwardly extending sides or wings 34 and 35 of the frame 33. The cover 31 has two holes in it in the sides as indicated at 40 and 41. Positioned over these holes are pieces of sponge rubber 43 and 44 having slots or openings in them providing communication between the interior of the garbage can to allow fumes to escape and to be directed over the pan 39 containing the lure or poison. A means is provided as in the previous embodiment to allow water to drip from the tank down into the pan. An alternative means may be provided in the form of a bent tube suspended over the edge of the tank as shown at 50 having a wick 51 in it whereby water can flow through the wick and drip into the pan.

As shown in the figures, the cover 31 is attached to a hinged strap or girdle 52 which attaches to the can. It is preferably made of flexible metal and has an end part having undulations 53 therein. The strap 52 is in two parts having ends secured to wire loop 53′ to form hinges. Loop 53′ has an upwardly extending loop part 54 which extends through slot 56 in the cover and is secured by wire member 57.

On one end of the strap 52 there is provided a buckle 60 having a pin or pintle 61. The end of the strap having the buckle overlaps the part having the undulations as seen in FIGURE 6. Attached to the buckle is a wire 58 which can extend through a hole in a bracket or ear 62 attached to the side of the can. The buckle can be buckled over one of the undulations with the pin or pintle 61 extended into a hole in an undulation for securely holding the strap.

Extending from a side of the cover 31 is a locking plate 63 having a cut-out 64. Attached to the strap 52 is an upwardly extending bracket 66 which can extend through the cut-out 64 in the plate 63. The cover may be locked or secured by the locking plate member which receives the bracket 66. The bracket 66 is attached by cord 67 to plate 63.

The operation of the trap of FIGURES 2 to 6 is similar to that of the previous embodiment. The lure is kept moist as described. The garbage fumes come up through openings 40 and 41 and are directed over the lure to assist in attracting the flies and insects. This adds to the trap's effectiveness. The trap is safe and portable. It can easily be removed to use an ordinary cover on the garbage can.

From the foregoing it will be apparent to those skilled in the art that the invention described herein achieves and realizes all of the objects stated in the foregoing as well as having all of the advantages enumerated.

The foregoing disclosure is representative of preferred form of the invention and is to be interpreted in an illustrative rather than a limiting sense, the invention to be accorded the full scope of the claims appended hereto.

I claim:
1. An insect trap comprising in combination, a first container having an imperforated bottom and side walls and an open top and having therein on the bottom of the container at the central part thereof only a lure in solid form for insects to be destroyed, an elevated second container containing liquid disposed adjacent to said first container, and means spaced from said lure providing for a relatively slow transfer of liquid from said second container to said first container whereby the liquid drips from said means onto the solid lure in said first container from a position above it for moistening the said lure, said first container having a spaced position relative to said second container allowing access of insects to the lure in said first container from the open top thereof, whereby dead insects accumulate in said first container.

2. A trap as in claim 1 wherein said second container is positioned over said first container with a space in between, said liquid transfer means comprising an elongated piece of solid porous material extending downwardly from said second container into a position over said solid lure to allow the liquid to drip directly thereonto.

3. A trap as in claim 2 including means comprising wire mesh screen enclosing the space between the containers to allow insects to have access to the first container.

4. A trap as in claim 1 including means comprising wire mesh screen enclosing the space between the container to allow insects to have access to the first container.

5. A insect trap as in claim 1, including a garbage can having a substantially flat cover, said insect trap being mounted on the garbage can cover, and means providing for communication of fumes from the interior of the garbage can and directing said fumes over the lure contained in said first container for additionally attracting insects, said cover having laterally spaced openings and said last means having channels therein communicating with said openings.

6. An insect trap as in claim 5 including means for fastening said cover to the garbage can comprising a flexible metal strap having means for clamping the strap about the upper part of a garbage can and means for securing the said cover to the said flexible strap.

7. An insect trap comprising in combination, a first container having side walls and an open top and having therein on the bottom of the container only a lure in solid form for insects to be destroyed, an elevated second container containing liquid disposed adjacent to said first container, and means providing for a relatively slow transfer of liquid from said second container to said first container whereby the liquid drips on to the solid lure in said first container from a position above it for moistening the said lure, said first container having a spaced position relative to said second container allowing access of insects to the lure in said first container from the open top thereof, a garbage can having a cover, said containers being mounted on the garbage can cover, and means for providing for communication of fumes from the interior of the garbage can and directing said fumes over the lure contained in said first container for additionally attracting insects, said means providing communication with the interior of the garbage can and comprising blocks of rubber material having channels formed therein having communication with openings in the garbage can cover and said channels being positioned to direct fumes from the interior of the garbage can over the open top of the first container.

References Cited by the Examiner

UNITED STATES PATENTS

| | | | |
|---|---|---|---|
| 1,056,535 | 3/1913 | Grimes et al. | 43—131 |
| 1,114,191 | 10/1914 | Shapiro | 43—120 |
| 1,187,426 | 6/1916 | Grigo et al. | 43—131 |

D. J. LEACH, *Assistant Examiner.*

SAMUEL KOREN, *Primary Examiner.*